(12) United States Patent
Magielse (10) Patent No.: US 10,244,600 B2
(45) Date of Patent: Mar. 26, 2019

(54) COLOR PICKER (71) Applicant: PHILIPS LIGHTING HOLDING B.V., Eindhoven (NL)

(72) Inventor: Remco Magielse, Tilburg (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/569,980

(22) PCT Filed: Apr. 7, 2016

(86) PCT No.: PCT/EP2016/057630
§ 371 (c)(1),
(2) Date: Oct. 27, 2017

(87) PCT Pub. No.: WO2016/173820
PCT Pub. Date: Nov. 3, 2016

(65) Prior Publication Data
US 2018/0160501 A1 Jun. 7, 2018

(30) Foreign Application Priority Data
Apr. 28, 2015 (EP) .................................. 15165445

(51) Int. Cl.
H05B 33/08 (2006.01)
(52) U.S. Cl.
CPC ..... H05B 33/0863 (2013.01); H05B 33/0845 (2013.01)

(58) Field of Classification Search
None
See application file for complete search history.

(56) References Cited

U.S. PATENT DOCUMENTS 6,611,297 B1 * 8/2003 Akashi ............... H04N 21/4131
348/602
8,878,991 B2 * 11/2014 Cook .................... H05B 37/029
348/460
2009/0122086 A1 5/2009 Diederiks et al.
2013/0271004 A1 * 10/2013 Min ................... H05B 33/0842
315/112
(Continued)

FOREIGN PATENT DOCUMENTS

JP 2008108598 A 5/2008
JP 2016514358 A 5/2016
WO 9856167 A1 12/1998
(Continued)

Primary Examiner — Crystal L Hammond
(74) Attorney, Agent, or Firm — Meenakshy Chakravorty (57) ABSTRACT A color picker controls a lighting system comprising one or more luminaries. A user interface comprises a display for displaying images when selected by a user via the user interface. The UI allows the user to select a region of a first image when displayed. Color selection information, which describes one or more color characteristics of one or more user-selected regions of at least the first image, is stored in a data store. When the user has selected a second image via the user interface, a region of the second image is automatically selected based on the color selection information. At least one luminaire of the lighting system is controlled to emit illumination rendering a color of the automatically selected region of the second image.

15 Claims, 8 Drawing Sheets (56) References Cited

U.S. PATENT DOCUMENTS

2014/0091731 A1* 4/2014 Fushimi ............ H05B 37/0245
                                                                                 315/292
2016/0262239 A1* 9/2016 Hole ................. H05B 33/0863

FOREIGN PATENT DOCUMENTS

WO     2008013502 A1   1/2008
WO     2013169642 A1   11/2013

* cited by examiner

COLOR PICKER

CROSS-REFERENCE TO PRIOR APPLICATIONS

This application is the U.S. National Phase application under 35 U.S.C. § 371 of International Application No. PCT/EP2016/057630, filed on Apr. 7, 2016, which claims the benefit of European Patent Application No. 15165445.6, filed on Apr. 28, 2015. These applications are hereby incorporated by reference herein.

TECHNICAL FIELD

The present disclosure relates to a color picker such as a color picker application running on a mobile phone or tablet, which allows a user to select a region from an image such as a photograph and, based on the color of the selected region, thereby select a color with which a lighting system comprising one or more luminaires will emit its illumination into an environment such as a room.

BACKGROUND

An existing color picker application (or "app") provides a way for a user to control the color of the illumination emitted from one or more luminaires of a lighting system (where the luminaires may be conventional ceiling or wall mounted luminaires, free standing luminaires or wall washers, or less conventional types of luminaire such as illumination sources built into surfaces or furniture, or any other type of illumination source for emitting illumination into an environment so as to illuminate the environment). An example of a color picker app is the Phillips Hue color picker. The color picker app displays an image to the user on a screen of the user device on which it is running, e.g. the image being a photograph captured by an in-built camera of the user device, or a photograph or other type of image downloaded to an internal storage of the user device. The app then allows the user to select a region in the displayed image having a particular color (whether defined by a specific set of color space values or a range of color values), from amongst a plurality of regions in the image having a plurality of different respective colors. Once the user has selected the desired region, the app samples the color from the selected region and controls the lighting system to render a lighting scene comprising the color in question, via the illumination emitted from one or more of the luminaires of the lighting system.

This provides a user-friendly way for the user to select a lighting scene, in that the user can select an image that or he or she appreciates and then simply select one or more colors from this image.

SUMMARY

As the functionality of lighting devices grows, it becomes more cumbersome for a user to control their lighting devices. As an example, imagine a user that has upgraded almost all of the lamps in his or her home to lamps having configurable illumination colors. Controlling the color of illumination emitted by each individual lamp out of a set of, say, 20 or more lamps would take an unreasonable amount of time using existing control mechanisms, especially if the user wishes to create multiple presets, for example for different occasions.

The present invention provides a way of simplifying this, by providing a more user-friendly control mechanism. The invention is based on the color picker principles described above, whereby illumination color is chosen by selecting one or more regions of an image. However, in contrast to existing color picker applications, when a user selects a new image, information about one or more previous region selections they have made for one or more previous images is used to automatically select one or more regions of the new image so that the user does not have to do this themselves. This, in turn, enables faster configuration of the lighting system with minimal user-interaction.

According to a first aspect, a user device comprises:
- a communications interface for communicating with a lighting system comprising one or more luminaries for illuminating an environment;
- a user interface comprising a display for displaying images when selected by a user via the user interface, the user interface being configured to allow the user to select a region of a first image when displayed;
- a record module configured to store in a data store color selection information which describes one or more color characteristics of one or more user-selected regions of at least the first image, the one or more user-selected regions having been selected by the user via the user interface;
- an automatic selection module configured to retrieve the color selection information from the data store and, when the user has selected a second image via the user interface, to automatically select a region of the second image based on the retrieved color selection information; and
- a controller configured to control at least one luminaire of the lighting system, via the communications interface, to emit illumination rendering a color of the automatically selected region of the second image.

In preferred embodiments, the user interface may be configured, in response to the user selecting the second image, to automatically display, on the display, the second image and an indicator of the automatically selected region of the second image. In some cases, multiple such regions of the second image may be selected, with a separate such indicator displayed for each.

Preferably, the user is free to modify the automatic selection(s). In this case, the automatic selection(s) may provide an intelligently chosen starting point for a color configuration of the lighting system, likely to be generally amenable to the user as it is based on their previous preferences as realized in their previous selection(s), but which the user may nonetheless wish to tweak. Accordingly, the controller may be configured, in response to the user subsequently selecting a different region of the second image via the user interface, to control the at least one luminaire to emit illumination rendering a color of the different user-selected region instead. For example, the user interface may be configured to allow the user to select the different region by moving the indicator from the automatically selected region to the different region.

The record module may be configured to store the color selection information in association with a color palette of the first image that describes a range of colors in the first image. The first image may be one of multiple images, for each of which respective color selection information is stored in the data store in association with a respective color palette of that image. The automatic selection module may be configured to search the color palettes of the multiple images, to detect that the second image matches the color palette of the first image, and to perform said retrieval based on the detected matching.

As an example, the user device may comprise a quantization module configured to generate the color palette for each image by applying a color quantization function to that image.

The user interface may be configured to allow the user to select multiple regions of the first image, and the user device may comprise an analyzer module configured to determine a relationship between color characteristics of different user-selected regions of the first image, the automatic selection being based on the determined relationship.

For instance, the determined relationship may comprise:
   a color separation measure describing a separation in a color space between colors of the different user-selected regions of the first image; and/or
   a clustering measure describing a clustering in a color space of colors of the different user-selected regions of the first image; and/or
   a distance measure describing at least one distance in a color space between clusters of the different user-selected regions of the first image.

The user device may comprise an analyzer module configured to determine a palette relationship between a color of at least one user-selected region of the first image and a color palette of the first image, the color palette describing a range of colors in the first image, and the automatic selection may be based on the determined palette relationship.

The first image may be one of multiple images, and the user device may comprise an aggregation module configured to perform an inter-image analysis of region selections made by the user across the multiple images. The automatic selection module may be configured to determine that the color of the automatically selected region of the second image matches a color indicated by the inter-image analysis to be preferred by the user, that region being automatically selected by the automatic selection module based on that determination.

The lighting system may comprise multiple luminaires, the user interface being configured to allow the user to associate each region they select with one or more of the multiple luminaires. The preferred color may be indicated by the inter-image analysis to be preferred by the user for the at least one luminaire, and the controller may be configured to select the at least one luminaire to emit said illumination on that basis.

In response to a selection instigation signal, the controller may be configured to control at least one other of the multiple luminaires to emit illumination rendering a starting color. The preferred color may be indicated by the inter-analysis to be preferred by the user in combination with the starting color, the automatic selection module being configured to select the region of the second image automatically based on the preferred and starting colors.

The selection instigation signal may be generated in response to the user selecting the starting color for the at least one other luminaire via the user interface, or automatically in response to the user selecting the second image.

A second aspect is directed to a computer-implemented method of controlling a lighting system comprising one or more luminaires for illuminating an environment. The method comprises: receiving from a user via a user interface a selection of a second image; retrieving from a data store color selection information which describes one or more color characteristics of one or more previously user-selected regions of at least a first previously user-selected image, the one or more previously user-selected regions having been selected by the user via the user interface; automatically selecting a region of the second image based on the retrieved color selection information; and controlling at least one luminaire of the lighting system to emit illumination rendering a color of the automatically selected region of the second image.

In embodiments, the method may further comprise steps in accordance with any of the user device or system features disclosed herein.

According to a third aspect a computer program product comprising code stored on a computer readable storage medium and configured when run on a computer to implement the method, and/or any user device or system functionality disclosed herein.

BRIEF DESCRIPTION OF FIGURES

To assist understanding of the present disclosure and to show how embodiments may be put into effect, reference is made by way of example to the accompanying drawings in which.

DETAILED DESCRIPTION OF EMBODIMENTS

Figure 1:
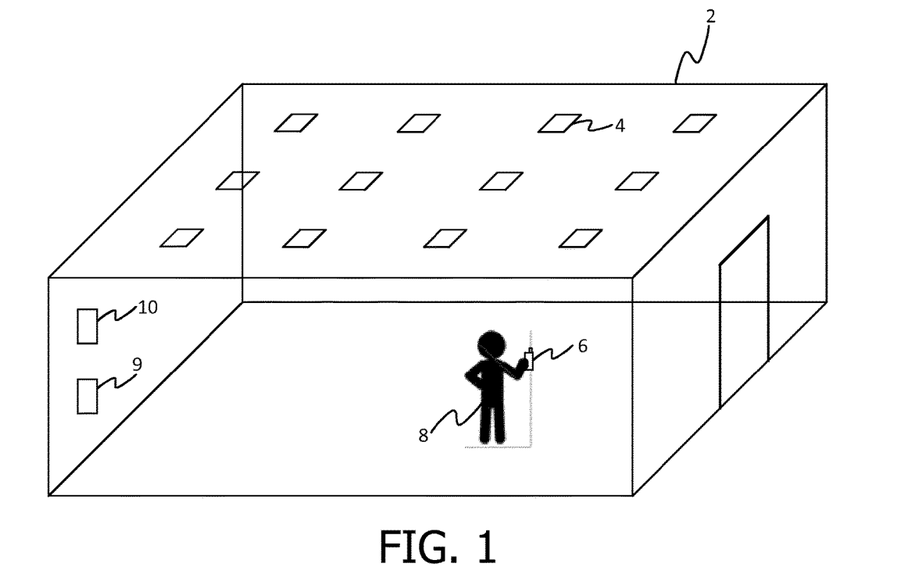
FIG. 1 is a schematic illustration of a lighting system.

FIG. 1 illustrates an example lighting system in relation to which the disclosed techniques may be implemented. The system comprises one or more luminaires 4 installed in an environment 2, arranged to emit light in order to illuminate that environment 2. Individual luminaires are also referred to as "lamps" herein. The luminaires 4 may for example be Phillips Hue lamps. The environment 2 may be an indoor space such as one or more rooms and/or corridors, or an outdoor space such as a park or garden, or a partially covered space such as a stadium or gazebo, or any other space such as an interior of a vehicle, or any combination of these. Each of the luminaires 4 comprises at least one respective light source such as an LED-based lamp, gas-discharge lamp or filament bulb, plus any associated housing or support. Each of the luminaires 4 may take any suitable form such as a ceiling or wall mounted luminaire, a free standing luminaire, a wall washer, or a less conventional form such as a luminaire built into a surface or an item of furniture, or any other type of illumination device for emitting illumination into the environment 2 so as to illuminate the environment 2.

To control the lighting system, a user device 6 is operated by a user 8. For example the user device 6 may take the form of a mobile user device such as a smartphone, tablet or laptop, or a dedicated remote control unit for the lighting system; or alternatively the user device 6 could be a non-mobile terminal such as a desktop computer or a wall-panel. The user device 6 is configured to be able to control the illumination emitted by one or more of the luminaires 4 in the lighting system. This includes at least being able to control the color of the illumination, and optionally one or more other properties such as overall intensity or a dynamic (time-varying) effect in the illumination. The user device 6 may be required to be present in the environment 2 to control the luminaire(s), but that is not necessarily so in all possible embodiments. To enable the user device 6 to control the illumination, there are a number of options, e.g. as follows.

Figure 2:
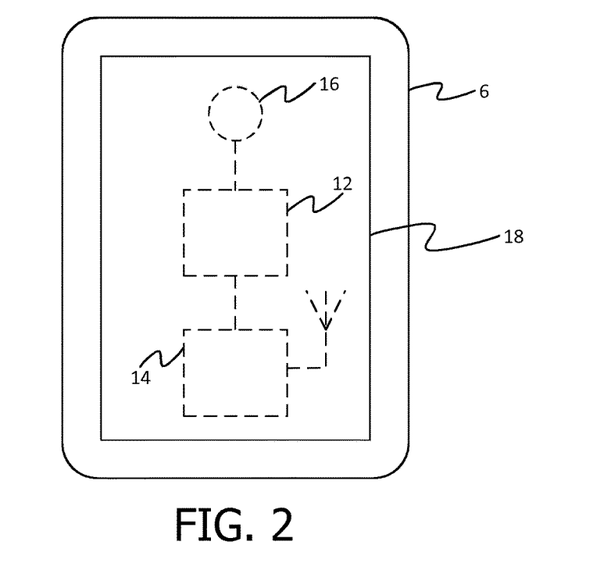
FIG. 2 is a schematic block diagram of a user device.

FIG. 2 illustrates the user device 6 in more detail. The user device 6 comprises a lighting control system 12, and communications interface 14 for communicating with the lighting system; the control system 12 being operatively coupled to the communications interface in order to perform, via said interface 14, the described control of the illumination emitted by one or more of the system's one or more luminaires 4. The communications interface 14 may comprise a wireless transmitter or transceiver such as a Wi-Fi, ZigBee or Bluetooth interface; or a wired connection such as an Ethernet, DMX or DALI interface. In the embodiments described herein the control system 12 is implemented in software code stored on a memory (comprising one or more storage devices) of the user device 6 and arranged so as when run on a processor (comprising one or more processing units) of the user device 6 to perform operations in accordance with the techniques disclosed herein. Alternatively the control system 12 may be implemented in dedicated hardware circuitry, or configurable or reconfigurable circuitry such as a PGA or FPGA, or any combination of software and hardware.

The user device 6 also comprises a device 16 for providing an image to the control system 12, enabling the control system 12 to control the color of the illumination based on one or more colors in the image, as will be discussed in more detail shortly. In embodiments this device 16 is a camera, preferably a camera built into the housing of the user device 6 such as in the case where the user device 6 is a mobile terminal (though alternatively it could be a camera such as a webcam external to the housing of the user device 6). Alternatively the device 16 for providing the image could be a memory storing the image, e.g. the image having been downloaded to the memory of the user device 6 from a network such as the Internet, or having been copied to the memory of the user device from another device such as a memory card or key. The following will be described in terms of a camera 16, but it will be appreciated that this is not limiting in all possible embodiments.

Further, the user device 6 comprises a user interface (UI) 18 operatively coupled to the control system 12. The user interface comprises a display in the form of a screen and means for receiving a user input indicating one or more regions of an image displayed on the screen. For example, the user interface 18 may comprise a touch screen enabling the user 6 to select a desired region of the image displayed on the screen by touching that region, or a point-and-click user interface comprising a mouse, track pad or tracker ball or the like allowing the user to direct a cursor over the desired region and to select that region by clicking a button with the cursor so positioned. As will be discussed in more detail shortly, the control system 12 is configured to control the color of the illumination to match (at least to an approximation) the color of the region selected by the user from the displayed image—i.e. to render that color.

In controlling the illumination emitted by the lighting system, the control system 12 on the user device 6 may use the interface 14 to communicate a lighting control request to each individual one of the one or more luminaires 4 being controlled, to control them individually. Alternatively the control system 12 on the user device 6 may perform the control by using the interface 14 to communicate a lighting control request to a central control module 10 (sometimes called a lighting bridge), which processes the lighting control request in order to in turn control the relevant one or more luminaires 4 accordingly. The central control module 10 may be implemented in a dedicated control unit installed in the environment 2, e.g. a wall-mounted control unit; or may be implemented on a server comprising one or more server units at one or more sites, either in the environment (e.g. same building) and/or off-site at a remote location.

Either way, the request may be acted upon unconditionally, or one or more conditions may be applied by the control module 10 or luminaire(s) 4. E.g. in the case where the control goes via a central control module 10, the central control module 10 may be arranged to verify an identity of the user device 6 or its user 8 before allowing the control; and/or may be arranged to verify that the user device 6 or its user 8 is found within a certain spatial or geographical region before allowing the control (e.g. based on an indoor positioning network or a presence sensing system), such as to verify that the user device 6 or its user 6 is located within the same environment 2 as the lighting 4 being controlled (e.g. the same room or building).

In the case of a wireless interface 14, the communication may be direct with a corresponding receiver or transceiver on each luminaire 4 or the central control module 10, e.g. using ZigBee or Bluetooth as the wireless access technology; or via an intermediate wireless router 9 disposed in the environment 2, e.g. using Wi-Fi as the wireless access technology (though these technologies are not limited to these respective direct or router-based arrangements).

Whether the control is performed via a central control module 10 or via communication individually with the one or more luminaires 4 being controlled, the control of the color may comprise either: controlling the color of the illumination emitted by each individual one of the one or more luminaires 4 to change its respective color, or controlling the color of the overall illumination created by multiple luminaires 4. In the former case, this is achieved by controlling individual elements of a given luminaire 4, such as red (R), green (G) and blue (B) elements (e.g. separate sets of RGB LEDs in an array of LEDs in an LED-based lamp), or any other mixture of colored and white-colored light sources. In the latter case, the color in question is an effect of the illumination from different luminaires 4 blending on a certain surface or at a certain point in space.

The target color to be created through the illumination is selected based on an image presented to the user 6 via the user interface 18. The control system 12 on the user device 12 is arranged to receive an image captured by the camera 16 (or retrieved from memory) and display it to the user 8 on the screen of the user interface 18. The user then selects a desired region of the image having a color that he or she wishes to render through the illumination from one or more luminaires 4 of the lighting system (which luminaires 4 are controlled could also be selected by the user, or could be predetermined or selected by the central control module 10).

The selecting of the desired region could be performed by the user selecting a certain point in the image (e.g. clicking or touching a certain point) and taking a pixel at that point, or an area comprising a plurality of pixels around that point. Alternatively the region could be selected in terms of its bounds, e.g. drawing around a region of the image with a mouse pointer or touch screen. The color of the selected region could also be defined in various ways. For example, this may be the color of the pixel at the exact point or the center of the region selected by the user, or could be a color representative of the pixel colors from multiple pixels in the region, e.g. a mean, median or modal value on each color space channel; such as a mean, median or modal value of each of the RGB channels; or of each of the luminance and chrominance channels (YUV); or of each of the hue, saturation and brightness channels.

In the examples described below, colors of pixels are represented in a CIE color space. Differently types of CIE color spaces exist such as those which conform to the XYZ CIE color space model, or the xyY CIE color space modes for example. A CIE color space is a continuous, three-dimensional space in the mathematical sense, i.e. each color is represented by a triplet (3-vector) of independent numerical values (e.g. XYZ, xyY). In each triplet, one value represents luminosity and the other two values represent chrominance. A gamut of human vision is defined as all colors visible to an average human, and can be represented as a volume of a CIE space having a horseshoe-like shape cross-sectioned when viewed along the luminance axis—see FIGS. 4A, 4B and 5, which each show a plane of constant luminance within a CIE color space with the gamut of human vision is labelled as G. A color emitting device, such as a luminaire 4, has a gamut which is the range of colors producible by that device. Such a device may not be able to produce all color within the gamut of human vision i.e. the gamut of a device may be a limited sub-volume of the former in the CIS color space.

Note that, in accordance with such three dimensional models, the term color as it is used herein encompasses both luminance and chrominance i.e. two color space 3-vectors which have the same chrominance values but different luminance values constitute different colors as the term is used herein.

In the following, colors are referred to as matching other colors or color ranges (i.e. areas/volumes in color space). A color may for example match another color when those colors are separated by less than a (fixed or possibly variable) predetermined distance in color space. This applies both to points in color space and areas/volumes in color space e.g. corresponding to a color cluster.

However selected, the control system 12 on the user device 6 then transmits a lighting control request indicating the target color (either exactly or within a certain approximation) to the lighting system, either individually to the one or more luminaires 4 being controlled or via the centralized lighting control module 10, based on one of the various possibilities discussed above. In response, the lighting system then renders the target color through the illumination from the one or more luminaires 4 in question. The target color may be communicated to the lighting system by sending coordinates in any suitable color space, such as RGB values; or luminance and chrominance values (YUV); or hue, saturation and intensity values; or x-y values, which are mapped onto a respective color gamut of the lighting system or a particular one of its luminaires (where the gamut is a predetermined subset of colors, e.g. the complete subset, that can be accurately represented by the lighting system). Or the color may even be communicated to the lighting system in other terms, e.g. by sending a predetermined color name or ID understood by the lighting system, etc.

Note: the target color which the control system 12 is controlling the one or more luminaires 4 to create—i.e. the color to be rendered—may be the color as immediately emitted from a given one of the luminaires 4 or each individual one of a plurality of the luminaires 4, or alternatively may be the color created by the illumination from a given one of the luminaires 4 or the combined illumination from a plurality of the luminaires 4 as appearing on a given surface in the environment 2 or as would be detected at a given point in space. In the latter cases, this may depend on a color of the surface, and/or any mixing of the illumination from different ones of the controlled luminaires 4 and/or other light sources.

As discussed above, the user device 6 provides the functionality of a color picker. In the case where this functionality is implemented in software arranged to run on the user device 6, this software may be referred to as a color picker application (sometimes referred to as an "app", especially in the case where the user device 6 is a smartphone or tablet). If the user 8 photographs a scene that he or she likes or is inspired by (or perhaps obtains an image by other means, such as downloading from the Internet), then the user 8 can simply select a region from that image having a color that he or she desires for the lighting in the environment 2, and the control system 12 and lighting system 4, 10 will automatically generate the desired illumination without the user having to understand the intricacies of lighting control.

An image displayed with color picker(s) in this manner is referred to as a "scene" hereinbelow. In other words, an image and at least one identifier of a particular region of that image and/or of a color of such a region constitute a scene. A scene may be represented by any suitable computer-implemented data structure. For example, a scene may be represented as an image object (in the OOP sense) representing an image, to which picker objects representing the color pickers are attached.

Using scenes to control lamps significantly simplifies the number of steps a user needs to take to control the lamps 4. A scene typically controls multiple lamps where each lamp can emit different light. All the light lamps 4 together create a light scene, such as a 'relax scene' where lamps are set to dimmed light level and pastel colors. Creating a scene can be performed in the color picker app by placing one color picker for each lamp (or group of lamps) in an image.

Figure 7A:
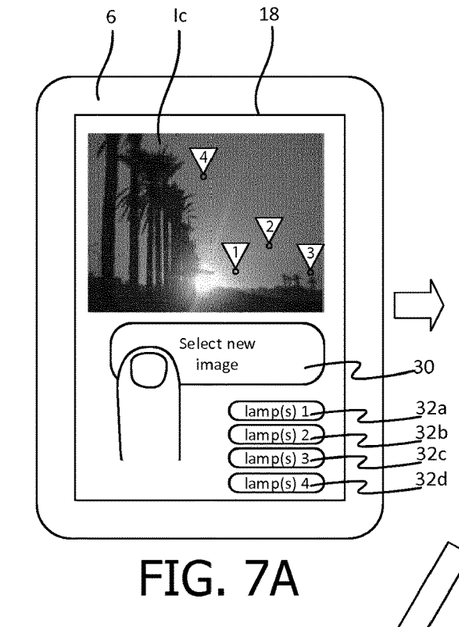
FIGS. 7A-7D show exemplary configurations of a display of a user device at different stages of a lighting system control process.

The color picker app provides a visual indicator ("color picker"), displayed via the user interface 18, that allows selection of a color of light to be emitted by a group of one or more of the luminaires 4. When there are multiple such groups, each group can be assigned a color by a different picker. Multiple luminaires can be grouped and a single picker can be used to control the group of luminaires. An exemplary user interface configuration is shown in FIG. 7A. Four color pickers "1", "2", "3" and "4" are shown overlaid on a current image Ic on the display of the user interface 18, each associated with a respective group of one or more luminaires "lamp(s) 1", "lamp(s) 2", "lamp(s) 3", "lamp(s) 4". The user can move each of the indicators, for example by dragging them to different image regions, to change the color rendered by its associated group. To initially create a color picker for a group of luminaire(s), the user may for example select a picker create option 32a, 32b, 32c, 32d for that group, and then select a location on the displayed image Ic at which the color picker for that is created in response. This causes the group of luminaire(s) to render a color that matches that of a region of the image at that location. Once created, the user can move the color picker in the manner described to change the rendered color to that of a different image region at a different location.

For existing color picker apps, when the user selects a different image to pick colors from, (s)he has to start the whole color picking process all over again from scratch. A user will typically want to create multiple scenes which, for existing color pickers apps, requires the user to, for each scene—i.e. each new image, place all the color pickers in the desired positions. The inventor has recognized that there is room to simplify this process and make it more user friendly.

If the user for example wishes to create a new scene, for the same set of lamps or for a different set of lamps, but with slightly different colors, he has to repeat the same process, placing all the pickers on the new image again.

Embodiments of the present invention improve the user friendliness by:
having a user pick colors in a first image using multiple color pickers (still one per lamp/group); then
determining a relationship between each color picker, i.e. a relationship between the selected colors, for that scene; and
determining colors and a relationship between colors for individual lamps across multiple previously-used scenes.

Figure 7B:
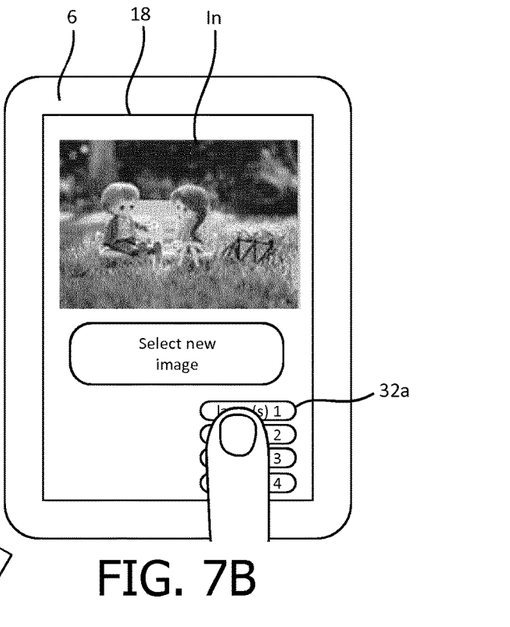

Colors to use for a second, new image (In FIGS. 7B-7D) are then automatically proposed based on steps (2) and (3). For example, if a user has selected the most saturated colors in the first image, then the color picker app would automatically select regions of a second, later-selected image having the most saturated colors.

Figure 7C:
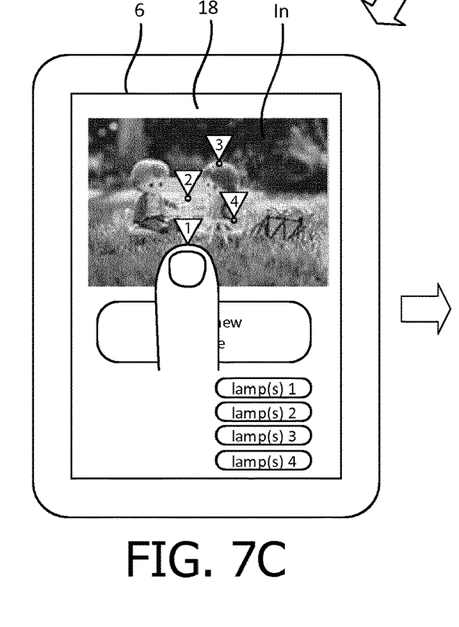
Figure 7D:
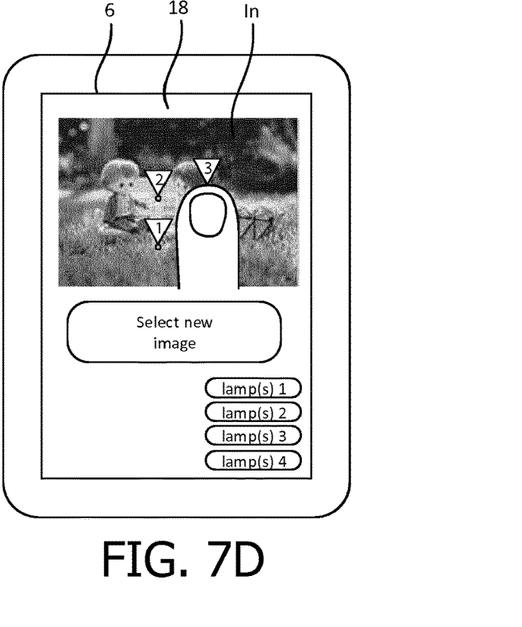

The second image In is displayed on the display of the user interface 18, with color pickers automatically placed on the second image In at the automatically selected locations. For example, in some cases the user may manually select the color picker create option 32a to create the color picker "1" for the first group (see FIG. 7B). In response to the user initially placing the color picker "1" on the second image, for example by taping a desired location of the second image In on a touchscreen, the color pickers "2", "3", "4" are automatically placed on the second image I (as shown in FIG. 7C) based on selection information pertaining to earlier user-selections. The user can then move any of the color pickers "1", "2", "3", "4" if desired (see FIG. 7D, which shows the user moving the color picker "3" for the third group).

To achieve this, a relationship between color pickers that a user has placed in a single earlier image, or across multiple earlier images, is determined, and the determined relationship used to automatically place the color pickers in the new image In when chosen by the user. The relationship(s) between the color pickers is analyzed and set from earlier image(s) to the new image. This allows a user to more rapidly create scenes for (a possibly large number of) lamps. For this process, two distinct steps are taken. Firstly, for each scene the relationships between the colors in that scene are analyzed in (what is termed herein) a "color structure" for that scene. This color structure abstractly describes colors that a user has selected and is used to predict what colors a user might pick in the future. Secondly, a process (with a similar goal) is performed for each luminaire group: the selected colors for each light source are analyzed and the relationship between them are described, resulting in a color structure for that luminaire.

Figure 3:
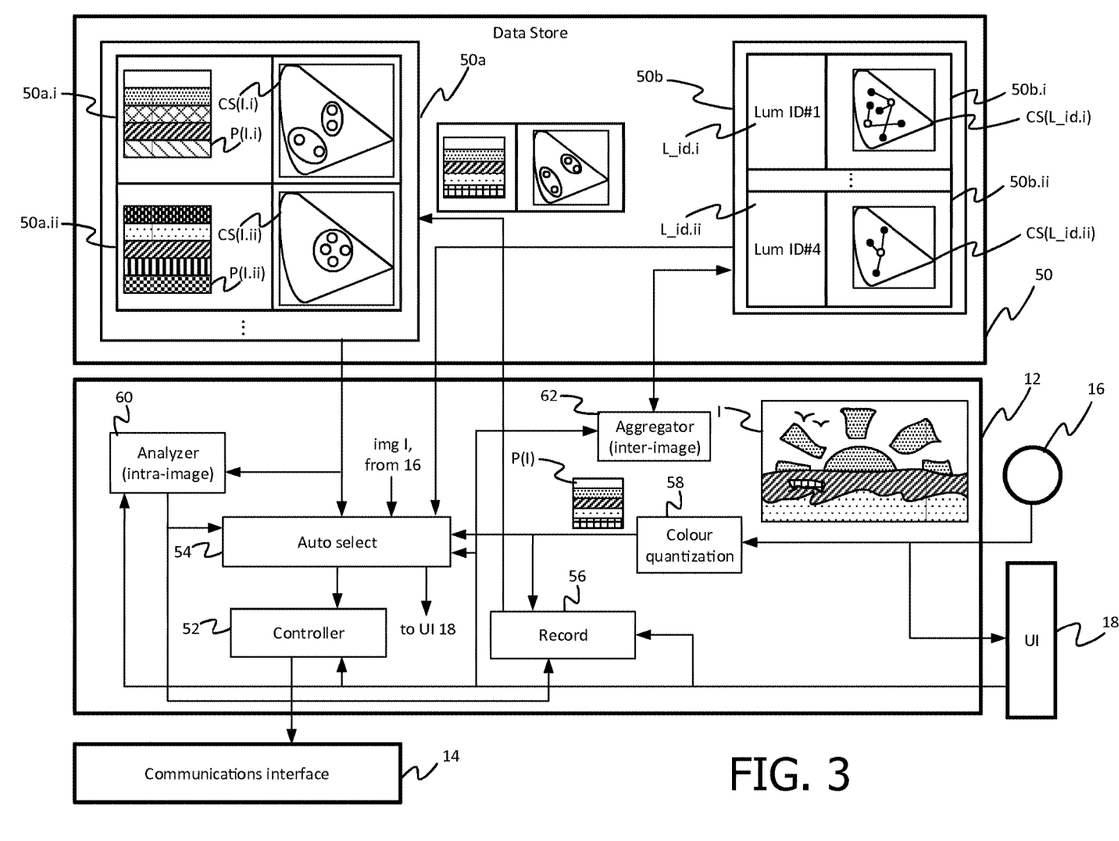
FIG. 3 is a block diagram showing functional modules of a user device.

FIG. 3 shows various functional modules (52-60) of the user device 6, which constitute the control system 12. In the embodiments described below, each of the functional modules represents respective functionality that is implemented by running code on the processor of the user device 6, though in general each functional module may be implemented in software, hardware, firmware etc. or any combination thereof. In particular, FIG. 3 shows a controller 52, an automatic selection module 54, a record module 56, a quantization module 58, an analyzer module 60, and an aggregator module 62. The controller 52 can control luminaires 4 of the lighting system, via the communications interface 14, to emit illumination rendering selected colors, in particular those automatically selected by the automatic selection module 54 in the manner described below.

FIG. 3 also shows a data store 50 which may be implemented as computer storage that is local to the user device 6, or remotely from the user device 6 and accessed via a network e.g. the Internet. The data store 50 is configured to implement a first database 50a (image database) and a second database 50b (luminaire database).

For each image I selected by the user, that image I is received from the device 16 by the control system 12. The control system causes that image to be displayed via the user interface 18 in the manner described to thereby create a corresponding scene on the display of user interface 18. In this example, the color quantization module 58 generates a color palette P(I) for that image I, comprising selective data of that image I. The color palette P(I) is generated using color quantization i.e. by applying a color quantization function to that image. That is, a color palette P(I) is determined for each image I that was used to create a scene.

A color palette P(I) for an image I means a computer-implemented data structure which somehow describes a range of colors in that image I—this includes the image itself, as the pixel values collectively describe this.

The color palette P(I) generated by the color quantize 58 for an image I may for example be a reduced-color version of that image itself, generated by mapping ranges of pixel values to color bins, whereby each bin constitutes a single color value representing a range of (now indistinguishable) colors in the original image. Alternatively, the color palette P(I) may be come other data structure describing a range of colors in the image. For instance, it may constitute an ordered list of a number of the most frequently occurring colors in that image I or of the most frequently occurring color bins in a color quantized version of that image.

In alternative embodiments, the color quantize 58 may be omitted, and the color palette P(I) may simply be the image I itself. Note the description below of the various uses of color palettes below applies equally to this scenario.

The image database 50a holds color selection information about previous user-selections for images individually. The image database 50a comprises a plurality of records 50a.i, 50a.ii, . . . , each comprising (individual) color selection information CS(I.i), CS(I.ii) for a single respective image I.i, I.ii, . . . and an associated color palette P(I.i), P(I.ii) of that single image I.ii, I.ii. A color palette of an image describes a range of color in that image and may for instance be all or some of the image data of that image, i.e. the image itself or selective image data thereof, or other information that describes the range of colors.

The luminaire database 50b holds aggregate color selection information pertaining to individual luminaires 4, obtained by analyzing and aggregating previous user selections across multiple images. The luminaire database 50a comprises a plurality of records 50b.ii, 50b.ii, . . . , each comprising a respective luminaire identifier L_id.i, L_id.ii, which identifies a respective luminaire group, and associated respective (aggregate) color selection information CS(L_id.i), CS(L_id.ii) for that group of luminaire(s). A luminaire group means a group of one or more luminaires i.e. an individual luminaire 4 or multiple luminaires 4 that are controlled as an individual entity.

The color selection information for an image, i.e. CS(I), or group of one or more lamps, i.e. CS(L_id), is in the form of a color structure for that image/scene or that group as applicable (see below).

Generating color structures for individual images.

The record module 56 is communicatively coupled to the UI 18, and manages the image database 50*a*.

For each image I that has been selected by the user 8, the record module 56 creates the record for that image I in the database 50*a*, which is populated with the color palette P(I) for that image I in association with a color structure CS(I) for that image I. As explained in more detail below, the color structure CS(I) may be generated by the record module based on 'raw' selection data received via the UI 18 from the user 8, or by the analyzer 60 performing an intra-image of multiple selections for that same image I.

The color selection information CS(I) can take a number of forms, and may for example comprise a respective color identifier or each color picker that the user places on that image I, which identifies a color of a region of that image I at which that color picker has been placed. So, for example, where the user places four color pickers for four luminaire groups, four separate color identifiers may form part of the color selection information—one for each picker. The color selection information CS(I) is updated as and when the user moves the color pickers to reflect the new selections. Some information about the initial selections may or may not be maintained so as to describe not only the user's 'final' selection but also information about how that selection has been arrived at.

Alternatively or in addition, where multiple color pickers are placed on the image I, the color selection information P(I) may comprise aggregate information about the multiple images generated by the analyzer 60.

A "color identifier" means data which identifies an individual color, i.e. a point/vector in color space, or a range of similar colors, i.e. a specific area or volume of the color space that is small in comparison to the gamut of human vision G, the latter being particularly applicable where each selected region is a multi-pixel region.

Figure 8A:
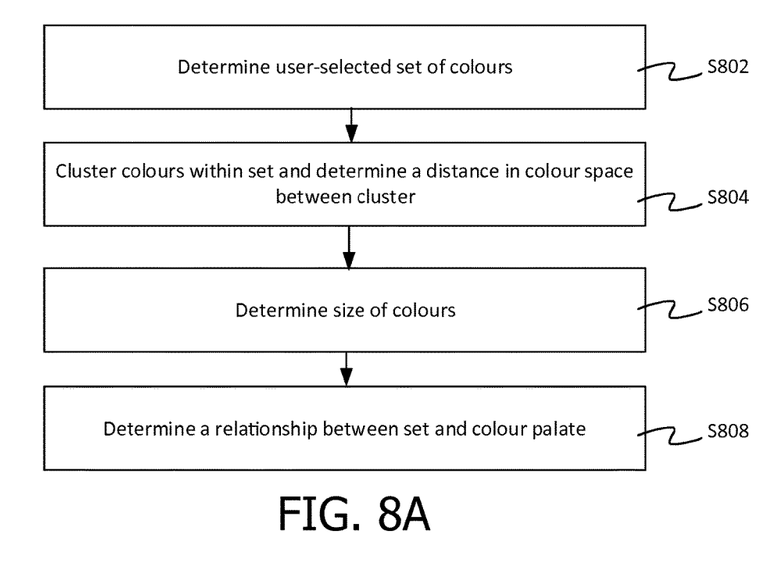
FIG. 8A is a flow chart for an exemplary process of determining a color structure for a scene.

The following is a description of an exemplary process to determine a color structure CS(I) for an image I/scene. Reference is made to FIG. 8, which is a flow chart for the process. The process is performed for every scene chosen by the user 8, and is implemented by the inter-image analyzer 60.

At step S802, a set of colors selected through the color pickers in the image I/scene are determined. For each scene, the image database record for that scene is populated with color selection information as follows.

The colors selected through the color pickers in every scenes are determined. For each scene, the image data base record for that scene is populated with information generated as follows A Euclidian distance, in CIE color space, between the colors within the set of selected colors is determined (S804). This distance can for example be determined using k-means clustering e.g. by i) clustering the colors in color space into one or more clusters using k-means clustering or other suitable clustering algorithm, and ii) computing a distance between (say) the center points of the clusters in color space. If they are all within one cluster, then the distance would be 0, and would all be treated as a single 'color' for the purposes of step S806 below, the single color corresponding to (say) the center point the cluster. For three or more clusters, multiple distances may be computed e.g. one distance for each cluster pair. Where the distance(s) is large, that indicates colors picked are spread equally over the color range. Where the distance is small, that indicates colors picked are more closely 'grouped' (for example, where three hues are selected close to soft blue and two hues are selected close to dark blue).

At step S806 a respective size of each cluster is computed, for example by computing a respective variance or other suitable spread metric for each cluster. The size of an individual cluster indicates the different tones of each individual color (the individual colors being the center points of the clusters) to use, where a large cluster indicates many different tones of the color and a small cluster indicates one tone of the color. In other words, the computed size of a cluster indicates an acceptable deviation in color space from (say) the center point of that color when making future selections based on that color structure.

Relationship between the set of selected colors can be determined based on the distance(s) and/or size(s) computed at steps S804-S806.

For example, a relationship can be determined based on at least one distance computed at step S804, examples being:
i. All colors picked by the user are hues within a color range (e.g. all reddish colors)—corresponding to single cluster/distance of 0 having been computed at step S804;
ii. The most or least saturated colors were picked by the user;
iii. Colors in the image that are furthest apart in color space were picked by the user.

This can then, for example, be refined based on the cluster size computations from step S806.

When it comes making future selection, the distance(s) computed at step S804 may indicate a color range of individual colors—say, red and orange. This would indicate that it (probably) doesn't make sense to add green or blue to that scene. The sizes from S806 then indicate the different tones of each individual color to use—in this example, which tones of red and orange.

As another example, if all the color clusters in the color structure are closely-spaced in the color space (e.g. all the clusters may be an orange region having a small size), then this may indicates a preference for colors similar to one another. When this color structure is later used to automatically select colors for a new image, the selection could be based on the cluster spacing and take into account its closeness by automatically selecting colors for all the lamps that are similar to one another, even if they are in a different region of the color space (e.g. all from a red or even blue or green region having substantially the same small size).

The determined color structure CS(I) describes the information obtained at each of steps S802-S806 so that it can be used to make automatic selections in the future. As an alternative to pre-determining this information in this manner, some or all of this information may not be stored in the database 50*a* and may instead be determined on-the-fly, i.e. as and when it is needed, e.g. from raw selection data held in the database 50*a*.

When the user 8 later selects a new image, the color pickers are placed in this image based on the determined, i.e. pre-determined and/or on-the-fly determined, color structure CS(I) (see below).

Figure 4A:
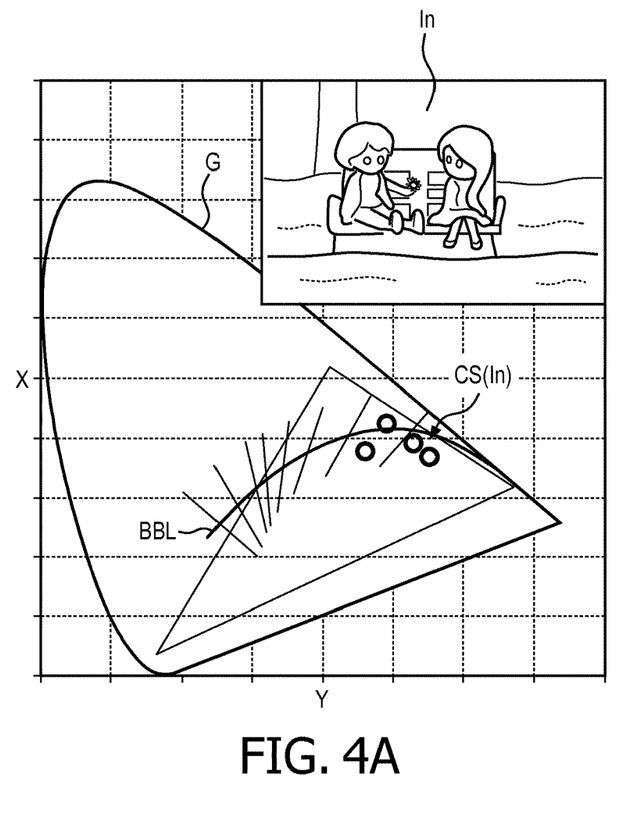
FIGS. 4A and 4B show color structures of different images.
Figure 4B:
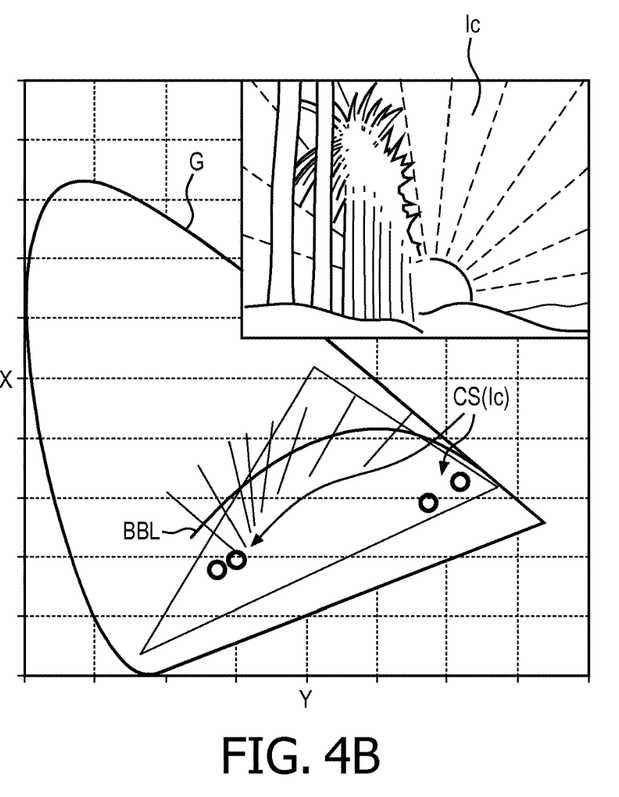

FIGS. 4A and 4B show exemplary color structures CS(In), CS(IC) for the different user-chosen images In, Ic, i.e. the different scenes, of FIGS. 7A-7D. Color indicators for the four exemplary luminaire groups are represented by un-filled circles in the color space.

FIG. 4A shows an example of a color structure based on the image In, which is an image of two dolls. One cluster of user-selected colors is evident, with whites and non-saturated pastel colors centered around orange/yellow. FIG. 4B is an example of a color structure for the image Ic, which is an image of a sunset. Two clusters are visible with saturated colors.

A color structure for an image thus describes a set of colors within the image and within the selected colors, i.e. a set of colors selected from that image, and a relationship between these colors. For example, there are scenes that have highly saturated reddish colors, whereas others have pastel colors in the blue/green color space.

Generating color structured for individual luminaire groups.

Figure 8B:
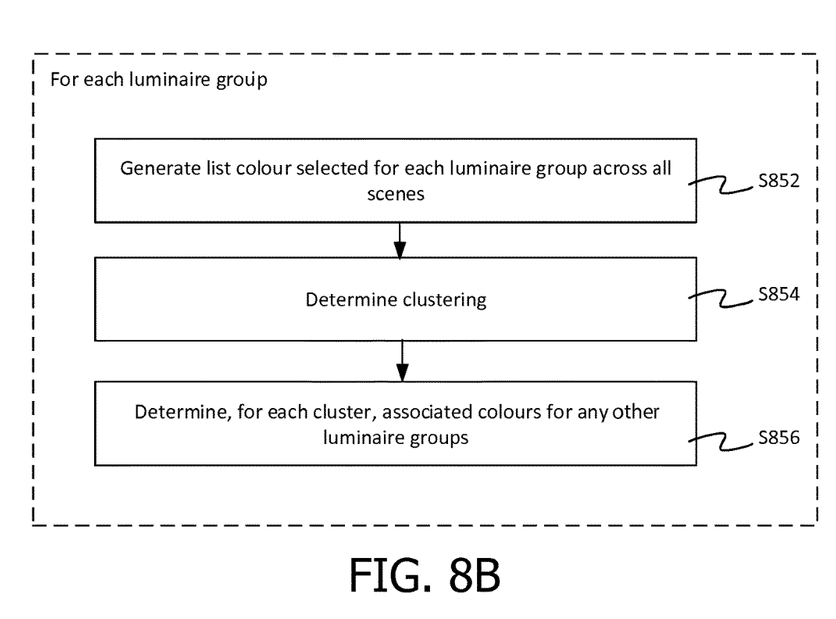
FIG. 8B is a flow chart for an exemplary process of determining a color structure for a luminaire.

The following process is performed to determine a respective color structure for each individual luminaire group. Reference is made to FIG. 8B which is a flow chart for the process. Steps S852-S856 are performed individually for each luminaire group.

The process constitutes an inter-image analysis, i.e. taking into account selections from multiple different images, and is implemented by the aggregator 62. The aggregator 62 maintains the luminaire database 50b, and updates it as appropriate based on this process.

At step S852 all the colors selected for that luminaire group across (multiple) scenes are determined. A set, e.g. a list or other data structure, of color identifiers identifying these colors is generated. For example, in some cases, the color identifies may be of color bins, wherein a range of colors is grouped into a single bin; in other cases, each color identifier may identify a range of similar color etc.

At step S854, clusters are identified within the set determined at step S852 i.e. the color identifiers are grouped into one or more cluster At step S856, for each of the one or more clusters, a respective set (e.g. list) of associated colors is generated. The set of associated colors contains color identifiers of the colors that the user 8 has selected for any other luminaire groups in combination with color(s) form that cluster. The one or more color clusters and any set(s) of associated colors constitute the color structure CS(L_id) for the relevant luminaire group.

In other words, the set associated with the cluster identifies one more colors which, historically, the user 8 has indicated a preference for in combination with color(s) from that cluster. Where there are multiple other lamp groups, this associated set may also identify one or more respective other individual luminaires for which each color in the set is preferred. For example, the set associated with a red cluster in a color structure of a first lamp group may identify that historically, say, blue and green are preferred for a second luminaire group when the first group is rendering red; that purple and orange are preferred for a third luminaire group when the first group is rendering red etc. Alternatively, the color structure for the first group may contain less specific information e.g. the set associated with the red cluster may, following the same example, simply say that blue, green, orange and purple are preferred for at least one other luminaire group when the first group is rendering red.

For each luminaire group, that group's color structure is stored in the luminaire database 50b in association with a luminaire identifier L_id identifying that group.

Figure 5:
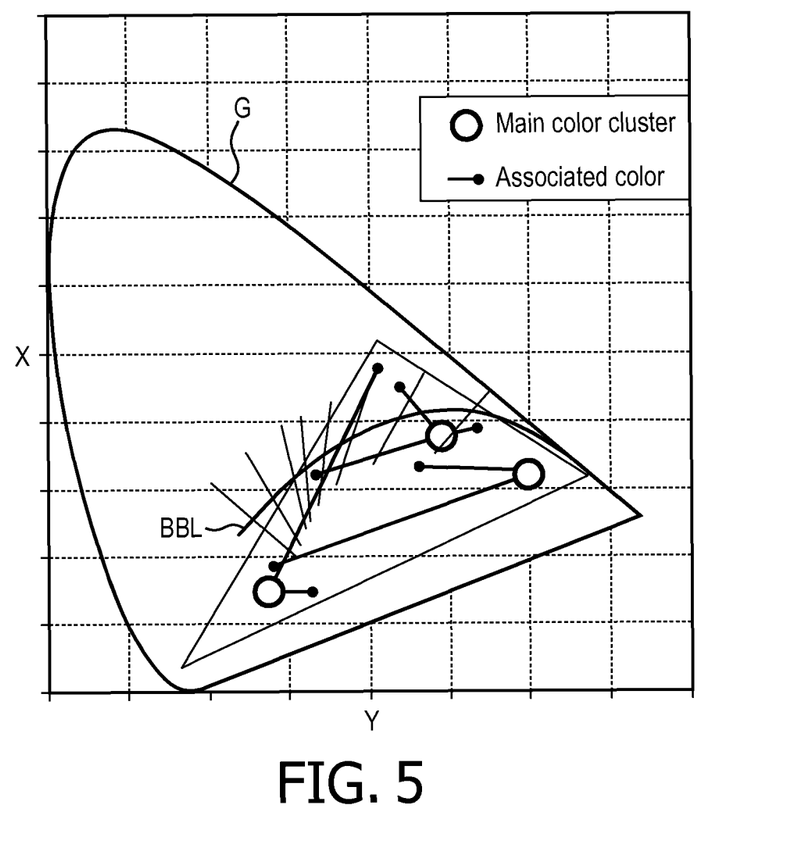
FIG. 5 shows a color structure determined for a luminaire(s)

The result is a respective color structure for each luminaire group, an example of which is illustrated in FIG. 5. This color structure describes how the luminaire group is used, and is used to predict what future colors the luminaire group might have. In FIG. 5, clusters determined for three luminaire groups are shown as larger, unfilled circles; their associated colors (i.e. representing colors previously selected by the user for other luminaire group(s) in combination with colors form that cluster) are shown as smaller, filled circles connected to that cluster by lines.

The example of FIG. 5 illustrates a situation in which the inter-image analysis may indicate that a luminaire group typically has the colors purple, orange and warm white; for the purple cluster, the associated colors of the other luminaire group(s) are pink and green.

For example, for a lamp that is used to render only 'warm white' lighting, the system will never propose a fully saturated blue color. Further, 'likely' combinations can be learned. For example, if a user likes to have blue in one corner and pink in another corner, the combination of blue-pink would be learned by the system.

Prediction using color structures.

The automatic selection module 54 selectively retrieves color structures from the two databases 50a, 50b, and uses them to automatically select one or more regions of a new image In when the new image In is chosen by the user 8. Color structures for images and luminaire groups are combined to predict colors for new images, using an automatic selection process implemented by the automatic selection module 54.

An implementation is one for which: the user 8 selects e.g. a blue color in the scene. For each lamp 4 it is then determined which colors are (often) combined with blue (e.g., yellow, orange, and green), based on a lamp color structure. The color structure belonging to that scene indicates that in this case orange matches, which means that the picker for this light is set to orange.

The process will now be described with reference to FIG. 9, which is a flow chart for the process.

The new image In is displayed via the UI 18 to create a new scene in the manner discussed.

At step S902, the new image In is loaded by the system 12, and a color palette P(In) for the new image In is generated.

At step S904, the image database 50a is searched based on the color palette P(In) to identify other scenes with similar palettes—that is having similar ranges of colors to the new image In. The scene color structure CS(Im) for a matching color palette P(Im), i.e. that matches the color palette P(In) of the new image In, is retrieved. P(Im) may for example be the color palette that is determined to be the most similar to P(In) out of the searched palettes. The retrieved color structure is then used in the following manner.

This is based on a matching criteria, which may for example be based on a (e.g. Euclidian-based) distance measure. For example, colors of each color palette could be clustered in color space (e.g. using k-means clustering), and the matching color palette P(Im) could be selected as the one for which a distance measure is minimized. E.g. the distance measure could be based on a (e.g. Euclidian) distance(s) between of the color cluster(s) of P(In) and those of P(Im), for example the distance(s) between the cluster center points. This is on the basis that the smallest Euclidean distance between the center points of cluster colors indicates the largest overlap between colors. This is just an example, and other matching criteria can be used. Alternatively or in addition, the matching criteria could be based on the number of clusters in the palettes—for instance, a match between two palettes may be more likely when they have a similar number of color clusters. Determining an appropriate matching criteria may involve a degree of tuning at the design stage, by the application of normal design procedures.

At step S906 a starting color picker is placed on the new image In via the UI 18 for one of the luminaire groups (starting group), e.g. in FIG. 7A the picker "1" for the group "lamp(s) 1". This picker is a "starting" picker in the sense that color pickers for the remaining luminaire groups ("2", "3" and "4" in this example) are then placed automatically on the new image in based, among other things, on the starting picker. 1*a*. The user may manually places the starting picker "1" on the image, or the starting picker "1" may be automatically placed on the new image in response to the user selecting the new image In. The controller 52 controls the starting group to emit illumination rendering a color of a region of the new image In at which the starting picker "1" is located (starting color).

At step S908, matching colors for each of the remaining luminaire group(s) are retrieved from the luminaire database 50*b* and communicated back to the scene for the new image In. More particularly, the luminaire color structure for the starting group is accessed, a color cluster in that color structure that matches the starting color is identified, e.g. the color cluster that is closest to the starting color in color space, and the set of colors associated with that color cluster in the luminaire color structure is retrieved (the associated set identifying color which the user has previously selected in combination with the starting color, as mentioned). This set of colors is in effect a set of possible colors for the remaining luminaire group(s) proposed by the starting luminaire group. Where the information in the set associated with a color cluster is specific to individual other luminaires, a respective set of one or more colors may be proposed for each remaining luminaire group that are historically preferred by the user for that luminaire group.

At step S910, for each of the remaining luminaire group(s): a respective color picker "2", "3", "4" is automatically placed on the new image at a location corresponding to a region that matches a color in the set retrieved at S910. The associated set may well contain multiple color identifiers of colors that are also present in or at least sufficiently close to colors in the new image In. The scene color structure retrieved at step S904 determines which of the colors which of the colors proposed by the starting luminaire group at are selected. That is, for each remaining luminaire group, a respective region of the new image having a color matching one in the retrieved set is selected, based on the retrieved scene color structure CS(Im) i.e. based on the user's previous selection for the previous image Im. The controller 52 controls each of the remaining luminaire groups to emit the color of the region automatically selected for that group.

A selection of color pickers for a new image based on an existing scene color structure is based on the color palette for the new image. Based on the extracted colors, the automatic selection module 54 determines which colors have been selected earlier by the user. For example, for a selection based on the color structure of FIG. 4A (i.e. where the new image is found to match the color palette of the image of FIG. 4A), if the new image has a palette of different low saturated colors, the system would propose the colors orange/yellow/white (if they are part of the palette of the new image). If the user then loads another image—say, an underwater image which is found to match the color palette of the image of FIG. 4A)—the system would propose to use blue and red/pink tones, because the user had selected that before.

In various embodiments, one or more of the following actions may be performed when the user creates a new scene:

The user 8 selected a first color with a first color picker (i.e. the starting picker) in the second image, after which the other color pickers are placed automatically in the image based on the color structure of the scene. For example, if the user 8 selects a highly saturated color, or a pastel color etc., it can be determined based on the relationship(s) between clusters within a color structure which other colors the user would be expected to combine with a highly saturated color, or a pastel color etc., and pickers can be automatically places on the image at locations having matching colors. The placement of the other pickers is determined by combining the scene prediction by the lamp prediction.

The same process can take place, whereby the complete picker placement is performed automatically, which does not require the user to place the starting picker as it is placed automatically instead.

Once the user has manually dragged a picker, the automated predictive behavior may be ignored. This means that a user that wishes to modify scenes manually can still do so.

As indicated above, an implementation of 1. is where, for example: the user 8 selects a blue color in the scene, for each lamp it is then determined which colors are (often) combined with blue—e.g., yellow, orange, and green (proposed set). The color structure belonging to that scene indicates that in this case orange matches, which means that the picker for this light is set to orange.

Figure 6:
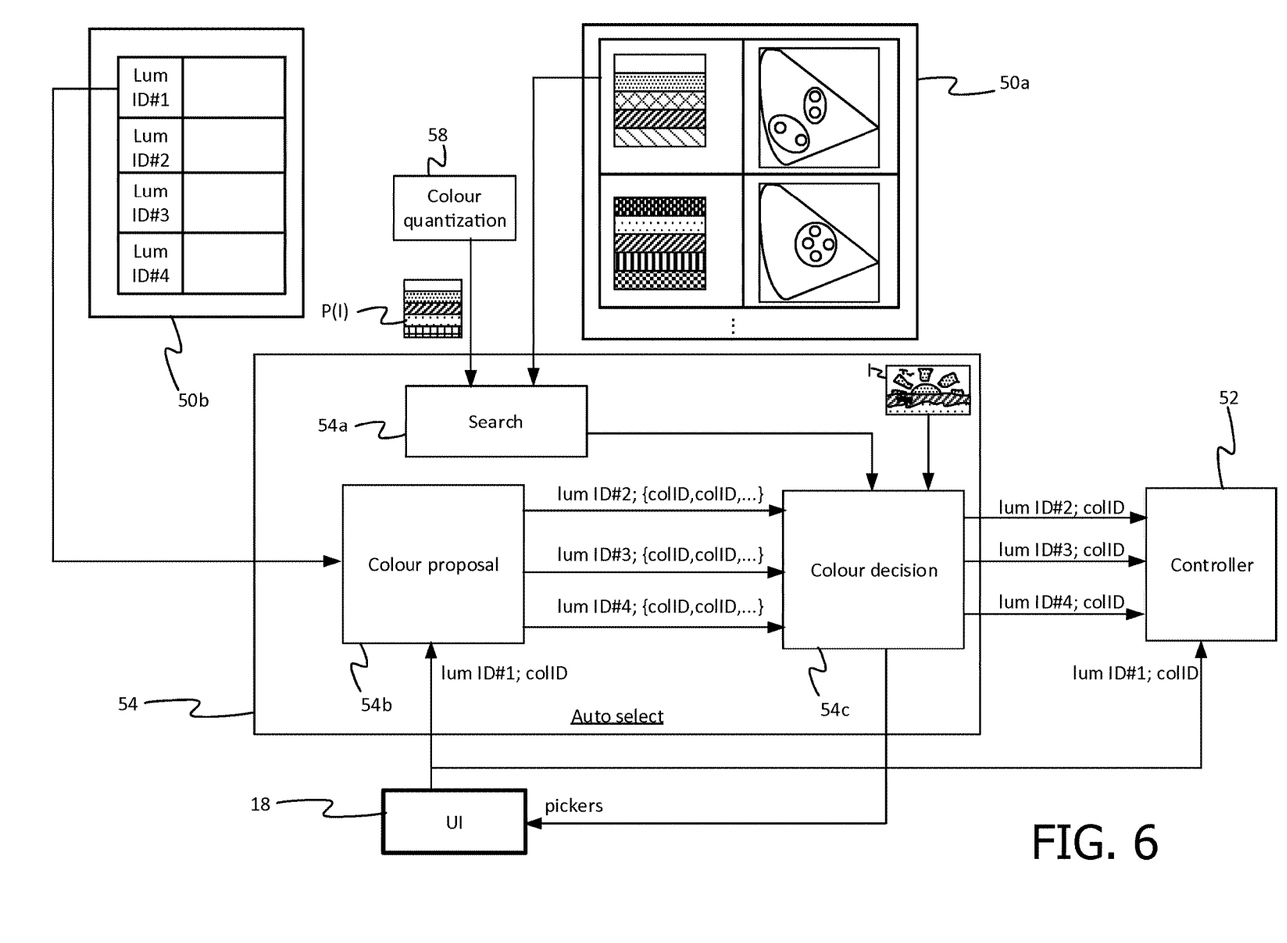
FIG. 6 is a block diagram showing functional modules of an auto selection module.

This will now be described with reference to FIG. 6. FIG. 6 shows a possible structure of the auto section module 54 in detail. As shows, the auto selection module 45 comprises a color proposal module 54*b*, a color decision module 54*c* and a search module 54*a*.

Figure 9:
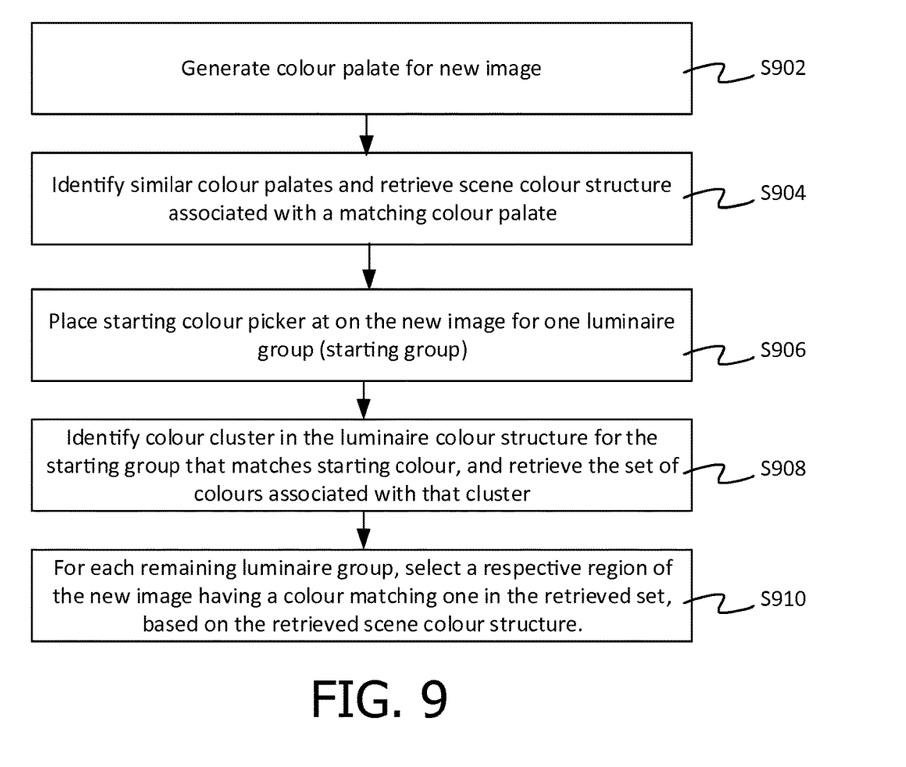
FIG. 9 is a flow chart for an automatic selection process for automatically selecting one or more regions of an image.

The search module 54*a* receives the color palette P(I) of the newly-selected image I, and searches the image database 50*a* to find the scene color structure with the matching color palette, implementing step S904 of FIG. 9A.

The color proposal module 54*b* receives a starting color picker selection (i.e. the very first color picker selection for the new image), indicating a starting color (i.e. that of the region of the new image at which the starting picker is located) from the user via the UI 18 in this example though as indicated this could alternatively be automatic. In this example, this is a selection of a color for a luminaire group identified by an identifier "lum id#1". Based on this, the color proposal module 54*b* accesses the luminaire database 50*b* to retrieve the lamp color structure for "lum id#1", and determines, for each remaining luminaire group—"lum id#2", "lum id#3", "lum id#4" in this example—a respective proposed set of multiple color identifiers based on the retrieved lamp color structure. The sets are proposed based on which colors the user has historically selected for the remaining luminaires in combination with the starting color, as indicated by the luminaire color structure for "lum id#1".

The color decision module then selects, for each remaining luminaire group "lum id#2", "lum id#3", "lum id#4", a respective region of the image I. This selection is based on: the retrieved lamp color structure the set of color identifiers proposed for that group, the matching image color structure located by the search module 54*a*, and the image I itself. For example, one color identifier from the proposed set may be selected based on the image color palette, and a region having a color matching that color identifier selected in the image I. As another example, colors which do not match any in the image I may be discarded from the proposed set, and one of the remaining colors then selected based on the image color structure. For each remaining luminaire group, the color decision module 54c controls: the luminaire(s) 4 in that group to emit illumination rendering the color of the region automatically selected for that group, and the UI 18 to display a color piker at a location of the region automatically selected for that group. The luminaire(s) of the initial luminaire group "lum id#1" are controlled to render the starting color.

As the user manually drags a picker, this information is added to the color structure of the scene and the lamps, which increases the predictive value of this information.

This process takes into account what colors the user 8 often assigns to which lamps and embodiment overcome the possible issue that a lamp that is always set to green by the user 8 suddenly turns to red when the user 8 creates a new scene.

In case no match can be found between the colors in the lamps and the color structure of the scene, the closest matching color can be used.

A default color structure may be included with each luminaire group, as a starting point to be updated thereafter based on the user's actual selections. The color analysis may be extended to include colors that should be avoided for each lamp. This might be achieved for example by suggesting colors to the user and monitoring whether the user changes (e.g. accepts or rejects) these proposed colors.

Additionally, meta-level information about the image may be added to enhance the automated process. For example, a name of the image, or tags associated to the image can be linked to its color structure. E.g. if the image has a "sunset" tag', other images that contain the character string "sun" may make use of earlier created color structures. In other words, the matching color structure may be selected from a restricted "pool" of scene color structures, the pool being selected based on meta-data associated with its constituent scene color structures. Where the following recites "multiple images" or similar, that includes multiple images which constitute such a restricted pool and thus excludes one or more other images which are not part of the pool (though this is not always the case).

When performed over time for multiple scenes, this process may result in different color structures that the user prefers. When it comes to automatically selecting regions of a new image, the selection process may be biased so that color structures that are identified as being preferred by the user are more likely to influence that process than ones which are identified as not being preferred. For example, scene color structures CS(I) identified as preferred may be preferentially selected, by the automatic selection module 54, over those not identified as such when attempting to find a match to the new image In.

The above considers the placement of pickers automatically on a second image based on past color selection information for a different image (i.e. first image). This does not exclude the possibility of a color picker being able to, in addition automatically place color pickers on an image based on its own color selection information, for example a set of color pickers for a different set of lamps. For example a scene could be created by the user for a series of Living Room lamps (say lamp numbers 1, 2, 3, 4) using a first image, and a similar scene could be created automatically for a Dining Room set (say lamp numbers 5, 6, 7) by automatically placing pickers on that same first image based on the Living Room scene.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A user device comprising:
   a communications interface for communicating with a lighting system comprising one or more luminaries for illuminating an environment;
   a user interface comprising a display for displaying images when selected by a user via the user interface, the user interface being configured to allow the user to select a region of a first image when displayed;
   a record module configured to store in a data store color selection information (CS(I), CS(L_id)) which describes one or more color characteristics of one or more user-selected regions of at least the first image, the one or more user-selected regions having been selected by the user via the user interface;
   an automatic selection module configured to retrieve the color selection information from the data store and, when the user has selected a second image via the user interface, to automatically select a region of the second image based on the retrieved color selection information; and
   a controller configured to control at least one luminaire of the lighting system, via the communications interface, to emit illumination rendering a color of the automatically selected region of the second image.

2. A user device according to claim 1 wherein the user interface is configured, in response to the user selecting the second image, to automatically display, on the display, the second image and an indicator of the automatically selected region of the second image.

3. A user device according to claim 2, wherein the user interface is configured to allow the user to select the different region by moving the indicator from the automatically selected region to the different region.

4. A user device according to claim 1 wherein the controller is configured, in response to the user subsequently selecting a different region of the second image via the user interface, to control the at least one luminaire to emit illumination rendering a color of the different user-selected region instead.

5. A user device according to claim 1 wherein the record module is configured to store the color selection information in association with a color palette of the first image that describes a range of colors in the first image;
   wherein the first image is one of multiple images, for each of which respective color selection information is stored in the data store in association with a respective color palette of that image; and
   wherein the automatic selection module is configured to search the color palettes of the multiple images, to detect that the second image matches the color palette of the first image, and to perform said retrieval based on the detected matching.

6. A user device according to claim 5 comprising a quantization module configured to generate the color palette for each image by applying a color quantization function to that image.

7. A user device according to claim 1 wherein the user interface is configured to allow the user to select multiple regions of the first image, and the user device comprises an analyzer module configured to determine a relationship between color characteristics of different user-selected regions of the first image, the automatic selection being based on the determined relationship.

8. A user device according to claim 7 wherein the determined relationship comprises:
   a color separation measure describing a separation in a color space between colors of the different user-selected regions of the first image; and/or
   a clustering measure describing a clustering in a color space of colors of the different user-selected regions of the first image; and/or
   a distance measure describing at least one distance in a color space between clusters of the different user-selected regions of the first image.

9. A user device according to claim 1 comprising an analyzer module configured to determine a palette relationship between a color of at least one user-selected region of the first image and a color palette of the first image, the color palette describing a range of colors in the first image, and the automatic selection being based on the determined palette relationship.

10. A user device according to claim 1 wherein the first image is one of multiple images, and the user device comprises an aggregation module configured to perform an inter-image analysis of region selections made by the user across the multiple images, wherein the automatic selection module is configured to determine that the color of the automatically selected region of the second image matches a color indicated by the inter-image analysis to be preferred by the user, that region being automatically selected by the automatic selection module based on that determination.

11. A user device according to claim 10 wherein the lighting system comprises multiple luminaires, the user interface being configured to allow the user to associate each region they select with one or more of the multiple luminaires;
   wherein the preferred color is indicated by the inter-image analysis to be preferred by the user for the at least one luminaire, and the controller is configured to select the at least one luminaire to emit said illumination on that basis.

12. A user device according to claim 10 wherein, in response to a selection instigation signal, the controller is configured to control at least one other of the multiple luminaires to emit illumination rendering a starting color;
   wherein the preferred color is indicated by the inter-analysis to be preferred by the user in combination with the starting color, the automatic selection module being configured to select the region of the second image automatically based on the preferred and starting colors.

13. A user device according to claim 12 wherein the selection instigation signal is generated in response to the user selecting the starting color for the at least one other luminaire via the user interface, or automatically in response to the user selecting the second image.

14. A computer-implemented method of controlling a lighting system comprising one or more luminaires for illuminating an environment, the method comprising:
   receiving from a user via a user interface a selection of a second image;
   retrieving from a data store color selection information (CS(i), CS(L_id)) which describes one or more color characteristics of one or more previously user-selected regions of at least a first previously user-selected image, the one or more previously user-selected regions having been selected by the user via the user interface;
   automatically selecting a region of the second image based on the retrieved color selection information; and
   controlling at least one luminaire of the lighting system to emit illumination rendering a color of the automatically selected region of the second image.

15. A non-transitory computer-readable medium comprising code s and configured when run on a computer to implement the method of claim 14.

* * * * *